J. OSTRANDER.

Improvement in the Manufacture of Nuts.

No. 5,121. Reissued Oct. 29, 1872.

WITNESSES { Harry Smith
Thomas M. Swain

Jonathan Ostrander,
by his Attys
Howson and Son

UNITED STATES PATENT OFFICE.

JONATHAN OSTRANDER, OF RICHMOND, VIRGINIA.

IMPROVEMENT IN THE MANUFACTURE OF NUTS.

Specification forming part of Letters Patent No. 113,332, dated April 4, 1871; reissue No. 5,121, dated October 29, 1872.

DIVISION B.

*To all whom it may concern:*

Be it known that I, JONATHAN OSTRANDER, of Richmond, county of Henrico, State of Virginia, have invented certain Improvements in the Manufacture of Nut-Blanks, of which the following is a specification:

My invention consists in manufacturing nut-blanks from a crude pile by a succession of passes between rolls, which gradually reduce the said pile, over a core or former, to the desired shape of the nut-bar, and by subsequently severing the bar into the desired lengths, as set forth hereafter, nut-blanks of a superior quality, as regards strength and solidity, being manufactured by the process.

Figure 1:
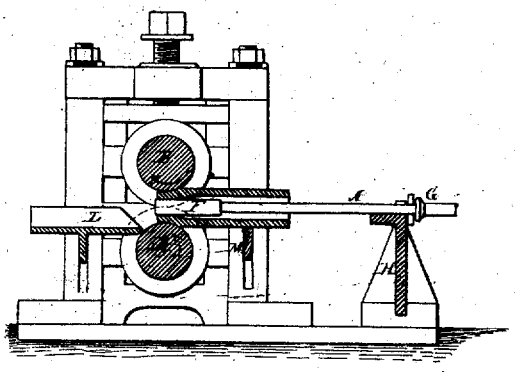
Figure 2:
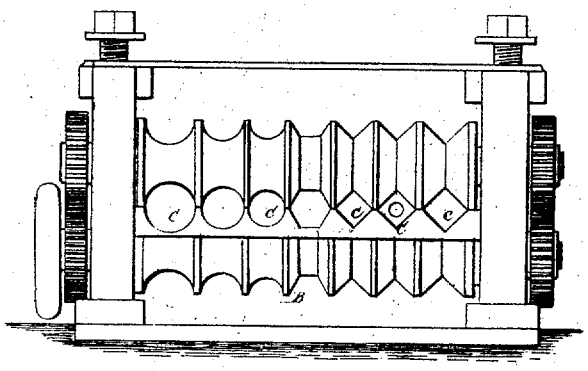
Figure 3:
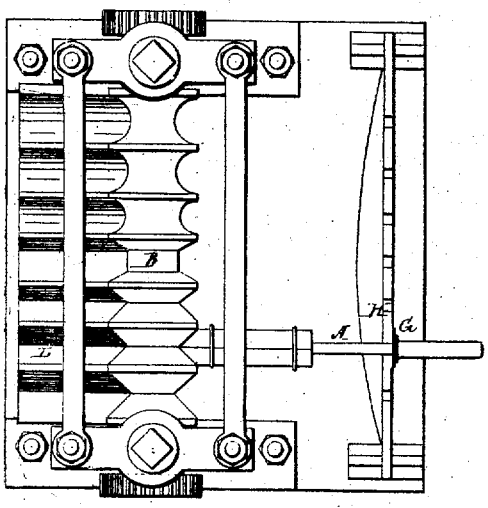
Figure 4:
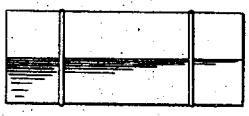
Figure 5:
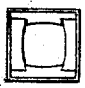
Figure 6:
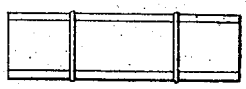
Figure 7:
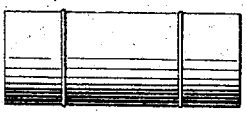
Figure 8:
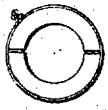
Figure 9:
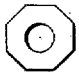
Figure 10:
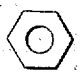
Figure 11:
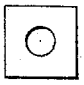

In the accompanying drawing, Figure 1 is a vertical section of a machine wherewith my invention may be carried into effect; Fig. 2, a side view of the machine; Fig. 3, a plan view; Figs. 4 to 8, inclusive, represent crude piles or fagots prepared for conversion into the desired nut-bars by the machine; and Figs. 9 to 11, inclusive, views of nut-bars completed by the machine.

It should be understood in the outset that the pile or fagot to be converted into a nut-bar may be of very crude character; it may consist, for instance, of old railroad iron or other scrap-iron, or may be composed of bars formed in the muck or puddle rolls from scraps or pig-iron, reliance being placed upon the gradual reduction of a crude mass to the desired shape of the nut-bar by a succession of passes between rolls, and not on any specific composition of the pile. It is in this respect that my invention differs from the ordinary process of manufacturing a tubular bar of a skelp bent, welded, and rolled, as in the manufacture of lap-welded tubes, or of bars bound together so as to assume the shape and dimensions of the desired tube, the bars being welded and shaped by a single pass between rolls.

In the drawing, B B are the rolls, having a series of grooves for reducing the crude fagot by a succession of passes to the desired tubular nut-bar, this gradual reduction being accomplished by rolling the fagot over a former or core, F, best observed in Fig. 1, the said core being attached to or forming a part of a rod, A, which rests in one or other of the notches in the bar H, against which a collar, G, on the rod A bears, as the rolls, turning in the direction of the arrow, reduce the pile and draw it over and from the core F. At the discharge side of the machine is a table having grooves corresponding in form and arrangement with those of the rolls, so that on each pass of the tubular pile the latter will be deposited in a groove adapted to it, and will consequently be prevented from turning and will retain its shape. The grooved table L is arranged to be vertically adjustable by screws or other means, its end fitting in elongated slots or grooves in the frames or housings of the machine. The tubular pile or fagot, which is much shorter and larger transversely than the tubular bar into which it has to be converted, may be composed of any desired number of pieces of scrap-iron, old rails for instance, or of bars formed in the muck or puddle rolls from scraps or pig-iron, the pieces of which the fagot is composed being bound together in the usual manner.

On making the first pass between the rolls while at a welding heat the several parts composing the pile will be united, and the pile reduced in diameter and elongated. A second pass will still further weld and condense the pieces of which the pile is composed and further elongate and reduce the bar, the continued passes and continued reduction of the pile finally reducing it to the desired tubular nut-bar, which is of a solid and homogeneous character, owing to the distribution of the welded parts throughout the bar by its gradual reduction. After the bar has been completed it is sawed into proper lengths for forming the desired nut-blanks, which can at once be converted into nuts by threading them internally in the usual manner.

I claim as my invention—

Manufacturing nut-blanks from a crude pile by a succession of passes between rolls, which gradually reduce the said pile on a core or former to a tubular nut-bar of the desired shape, and subsequently severing the bar into the desired length, all as set forth.

In testimony whereof I have signed my name to this specification in the presence of two subscribing witnesses.

JONATHAN OSTRANDER.

Witnesses:

CHARLES E. FOSTER,
A. G. HEYLMUN.